Patented Dec. 10, 1935

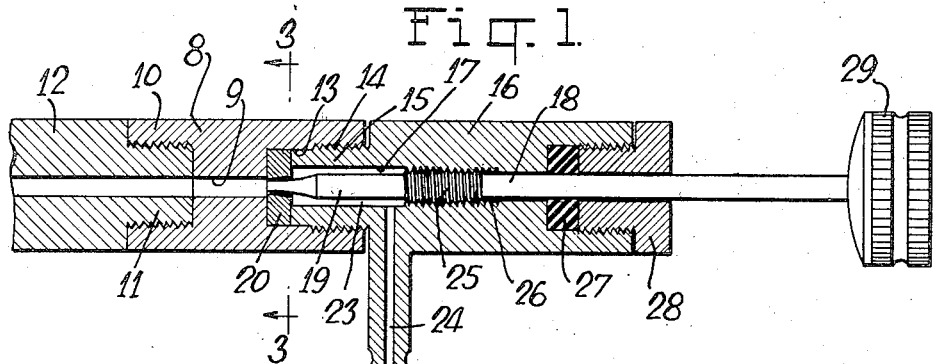
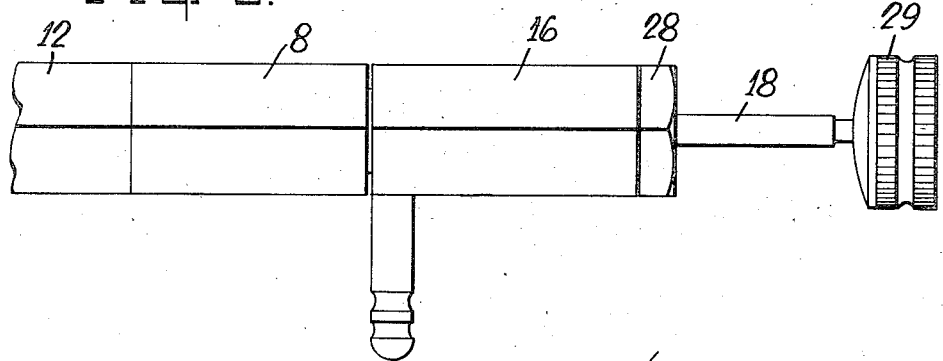
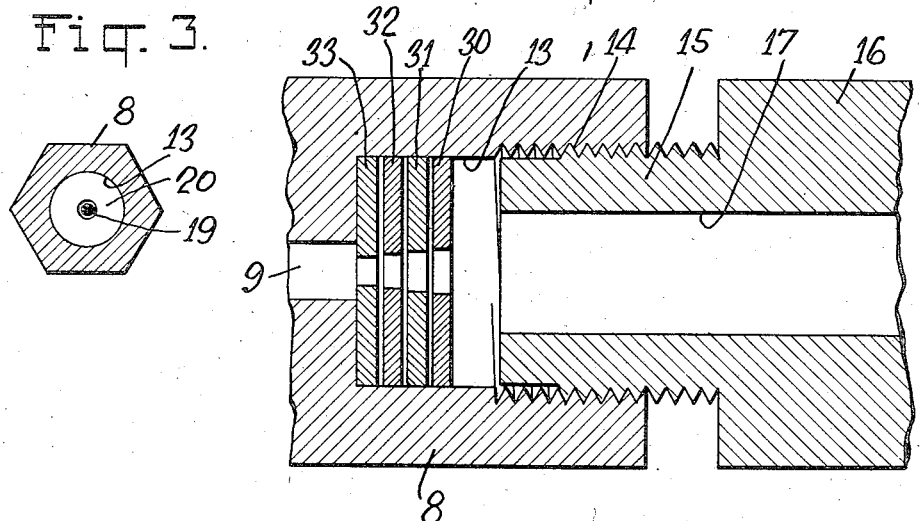

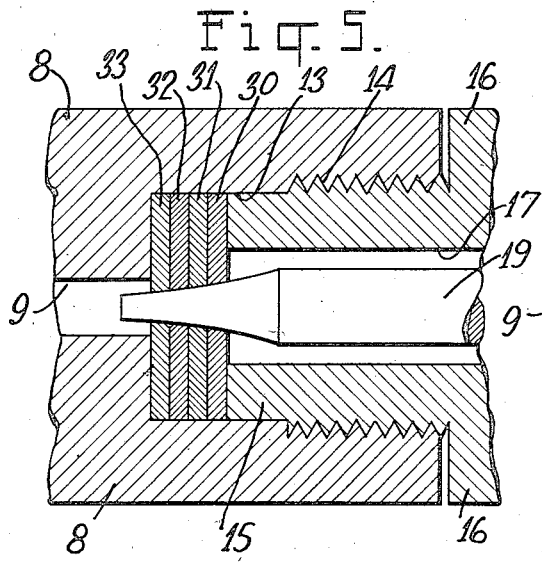
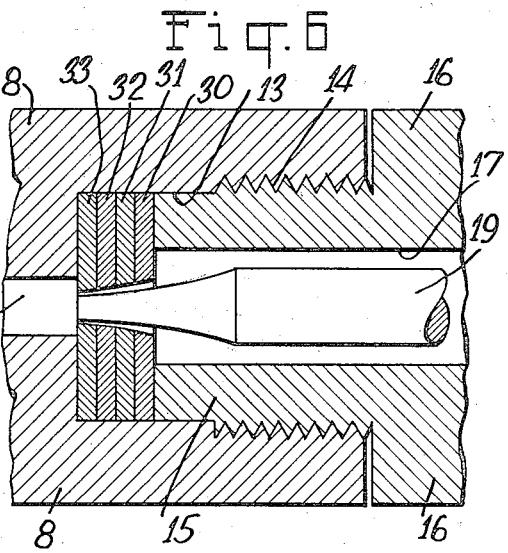
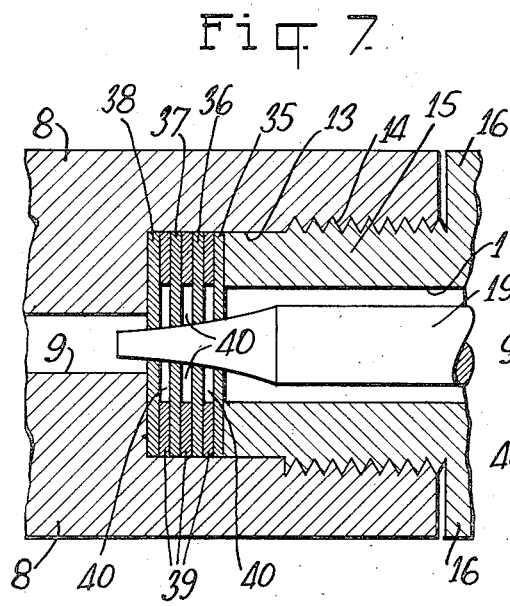
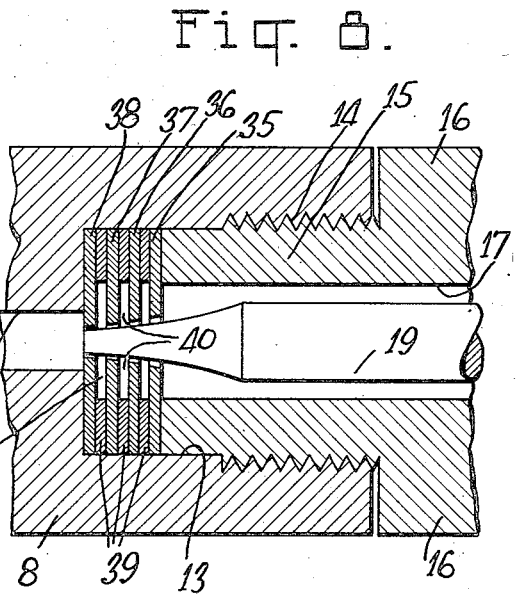

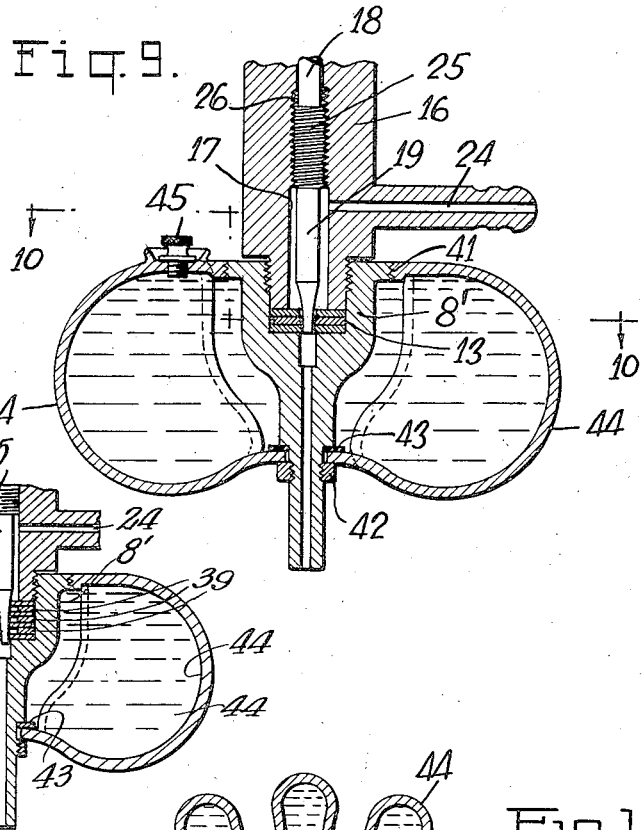
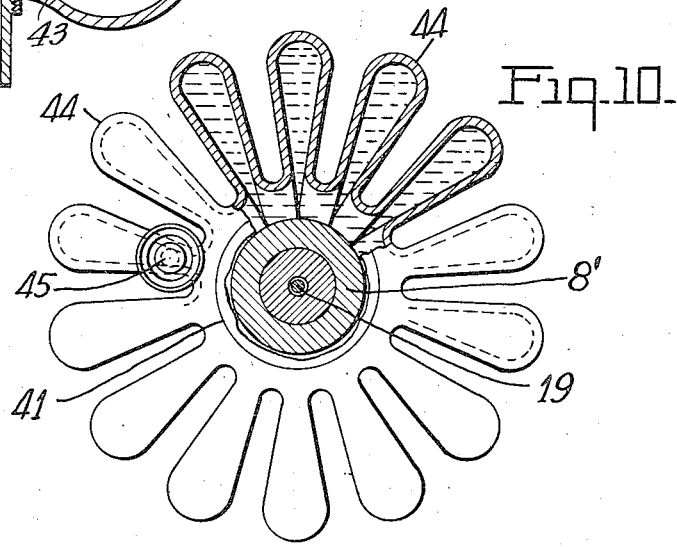

2,023,915

UNITED STATES PATENT OFFICE 2,023,915

DECOMPRESSION VALVE

Karl Connell, Branch, N. Y.

Application February 28, 1930, Serial No. 432,274

22 Claims. (Cl. 137—111)

This invention relates to devices utilizable in connection with the expanding of compressed gases, and, more particularly, to decompression valves.

In general, it is an object of the invention to provide a decompression valve which is simple in construction, has an especially long life, wherein relatively great differences in temperature throughout the different parts are avoided, and which will efficiently accomplish the purposes for which it is intended.

A more specific object of the invention is directed to the provision of means of supplying heat to the expanding gases.

Another more specific object of the invention is to provide a valve construction wherein the expansion of compressed gases is advantageously controlled.

Another object of the invention is to provide a valve construction wherein the valve stem is advantageously mounted.

Among the other objects of the invention are the provision of means to advantageously control gas expansion, the provision of a valve seat arranged to compensate for the unequal pressures and unequal temperature conditions throughout the passage of gas through an orifice provided by the seat, and the provision of means to secure even seating of a valve pin.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description taken in connection with the accompanying drawings, in which:

Figure 1 is a sectional view of a valve construction embodying the invention;

Fig. 2 is a side view thereof;

Fig. 3 is a lateral section along the line 3—3 of Fig. 1;

Figs. 4, 5, and 6 are detail sectional views of another form of valve construction embodying the invention, Fig. 4 showing the same in the process of assembly, Fig. 5 showing the same with the valve closed, and Fig. 6 showing the same with the valve open;

Figs. 7 and 8 are detail sectional views of still another form of valve construction embodying the invention, showing the valve in closed and in open position respectively;

Figs. 9 and 10 exemplify a valve provided with means for readily supplying heat to the body of the valve, Fig. 9 being a longitudinal section of a portion of such a valve, and Fig. 10 being a transverse section along the line 10—10 in Fig. 9;

Fig. 11 is a view similar to Fig. 9 wherein the valve seat is shown as constructed similarly to Fig. 7.

In a decompression valve construction it is of importance that the assembly have considerable rigidity and strength and at the same time that heat be conducted to the expanding gases sufficiently fast to prevent such differences in temperature in various parts of the valve as will have an unfavorable effect upon the materials of which the construction is composed, and sufficiently fast so that the gases will not freeze in the channels of decompression. It is likewise of importance that the passageway through which the gas passes be so constructed that the gas will expand in a particularly favorable manner, and at the same time be so formed that its walls will resist erosion to a maximum degree, and it is also desirable to form the valve seat in such manner that it can be readily replaced when unavoidable erosion of its surfaces to such an extent as to interfere with the valve action has occurred.

The exemplified construction comprises a cylindrical member 8 having a central bore 9, and provided at one end with a threaded portion 10 adapted to receive the correspondingly threaded end 11 of a member 12 providing a conduit leading from a chamber for compressed gases, not shown. At the other end of the member 9 there is provided an enlarged bore 13, the outer end 14 of which is threaded and adapted to receive the partially threaded forward end 15 of a cylindrical member 16 having a cylindrical bore 17 through which there extends a valve stem 18 carrying at its forward end a valve pin 19. In the inner portion of the bore 14 there is provided a valve seat composed of material having a high thermal conductivity, such, for example, as silver, copper, alloys thereof, and other elements and alloys which are relatively good conductors of heat. In general, the invention contemplates the use of metallic substances having a heat conductivity not materially lower than copper, for example, substances having a thermal conductivity greater than 60 determined on a basis of silver as 100.

By forming the valve seats of such materials, the heat contained in or applied to casing members, such as shown at 8 and 16 in the present instance, which may be formed of suitably strong and readily tooled material, such as brass, may be conducted inwardly to the channel in which the expanding gas flows so as to reduce to a minimum the temperature difference between various parts of the assembly. The use of a material having a high thermal conductivity also eliminates the likelihood of the gas freezing on decompression, thus clogging the passageway and varying the flow. Virgin silver, because of its high heat conductivity, is particularly desirable for such use, but, in view of its softness and its tendency to be eroded by the gas flow, it is in certain instances desirable to reinforce a layer of virgin silver, if used, by a layer of a suitable harder metallic substance, such as coin silver. If desired such a reinforcing layer may be placed at either side of the soft metal. However, where the valve seat is mounted in the exemplified manner, being held in place by the reduced diameter end of the removably mounted pin 15 so that the seat itself can be easily removed and replaced, it is possible to form the valve seat wholly of virgin silver or other high heat conductive material, and to replace the seat when the same becomes eroded.

In the construction exemplified in Fig. 1 the valve seat 20 is composed of a single metallic substance, such as silver.

As will be seen the diameter of the exemplified valve pin increases longitudinally along the stem, and the bore of the valve seat is similarly shaped to receive the pin. Preferably the valve pin is so formed that the increase in its diameter is first relatively slow and then more rapid, whereby, if it is utilized in connection with a similarly formed valve seat, the channel for the passage of the gas, when the valve is open, not only increases in external diameter and consequently in area, but also increases in radial distance between its inner and outer walls. The pin and bore in the valve seat may be so formed for example, that their surfaces, when viewed in longitudinal section, correspond to similar portions of parabolic curves.

In order to permit the escape of the decompressed gases, suitable passageways such as shown at 23 and 24 are provided in the cylindrical member 16. The valve stem 18, which in the present instance is integral with the pin, and which may be composed of any suitable metal, such for example, as Monel metal, is adjustably mounted within the member 16, so that the pin may be made to properly coact with its seat. It has been found that the thermal conditions adjacent the valve itself are such as to interfere with the proper functioning and the permanency of any mounting which is positioned adjacent the valve seat, and accordingly the mounting for the valve stem is preferably formed at a point removed from the valve seat. In the exemplified apparatus this mounting is provided by means of cooperating screw threads 25 and 26 formed on the members 18 and 16 respectively at a point intermediate the ends of the member 16. As will be seen, the stem 18 is spaced from the inner wall of the bore of the cylinder 16 throughout the remainder of its length. By so positioning the mounting of the valve stem, the threaded bearings or other mounting connections will be less subject to thermal aberration and the valve pin will have greater freedom in finding its own center, than where the suspension of the valve stem is close to the valve seat.

The outer end of the bore in the member 16 may be suitably closed as by a packing ring 27 and a screw cap 28, and the valve stem is provided with a suitable operating handle 29.

Because of the strong erosive forces of the gas adjacent the inner end of the bore through the valve seat, the rapid absorption of heat by the gas adjacent the outer end of the valve seat bore, and the other conditions resulting from the passage and expansion of the gas, the invention in certain of its aspects contemplates the provision of a valve seat composed of layers of materials, particularly metallic substances having a high thermal conductivity, which have unequal properties of malleability, elasticity and resistance to friction and abrasion under operating conditions, so that the valve pin shall uniformly seat over the whole extent of the valve seat surface even after the valve has been used for a considerable period, and so that the valve, when open, will provide a proper channel for gas flow. In this connection it is to be observed that a desirable gas flow channel is one which increases in cross sectional area from its inner to its outer end.

There is exemplified in Figs. 4, 5 and 6 a valve construction embodying a laminated valve seat satisfying this requirement. This valve seat is composed of a plurality of metallic annuli 30, 31, 32 and 33. The outer annulus 30 which is disposed at the point where the greatest expansion of the gas occurs, is preferably composed of a metal such as virgin silver, which, although relatively soft, has an especially high heat conductivity. The next annulus 31 is, in the present instance, composed of an alloy of silver which is harder than virgin silver, but which has a higher heat conductivity than copper. The next annulus 32 is composed of copper; and the inner annulus 33 in the present instance of an alloy, such as an alloy including silver and copper, which is harder than copper, but nevertheless has a higher heat conductivity than the ordinary metallic substances.

Preferably in this case, also, the valve pin and the bore of the valve seat are so formed that the diameter of each increases in the direction of the gas flow, this increase being more rapid as it continues in the direction of the flow. As exemplified, the outer surface of the valve pin and the inner surface of the bore are defined by the revolution of similar portions of parabolic curves; and as will be seen, the exemplified construction not only provides a rapidly increasing area for the gas flow throughout the bore when the valve is open, but also assures a proper seating for the valve pin. This seating ordinarily takes place against all of the annuli; and a seating against the inner annulus, where a close seating is of particular importance, is assured in cases where this annulus is composed of a harder metal than the other annuli so that any enlargement of the bore by erosion of the gases or by the abrasion, and metal stress of repeated closure of the valve is minimized at this point.

In assembling this valve, the annuli are dropped into place in the bore 13 in the manner indicated in Fig. 4, and are pressed firmly against the face of the member 8 by screwing in the member 16. They are thus held tightly in place, and nevertheless can be removed for replacement at any time with comparative ease. If desired, the annuli may be formed with cylindrical bores, as indicated in Fig. 4, since the operating conditions ordinarily suffice to properly align the seat with respect to a suitably shaped hard-metal valve pin.

A particularly well-controlled decompression can be obtained by employing a series of expansion chambers, in each of which the gas is exposed to a metal having a relatively high thermal conductivity. Such a valve may be formed, for example, by spacing a plurality of annuli, such as shown in Figs. 4, 5 and 6, these annuli being preferably formed as in the preceding figures, to provide a bore in which the valve pin seats satisfactorily and effectively, and which provides, when the valve is open, a rapidly increasing area of gas flow between the various chambers. One such arrangement is shown in Figs. 7 and 8, wherein the valve seat is composed of a series of annuli 35, 36, 37 and 38, which are spaced from one another as, for example, by washers 39, so as to provide expansion chambers 40 therebetween. The annuli 35, 36, 37 and 38 are composed of suitable metallic substances having a relatively high heat conductivity, and preferably increase in heat conductivity and decrease in hardness in the direction of the flow of gas; for example, these annuli may be formed of the same materials as the annuli 30, 31, 32 and 33 respectively, it being understood that each individual annulus may be formed of any metallic substance which satisfies the needs for an annulus in its position. In certain instances the valve seat may be formed of a single metallic substance of any desired type, but having its bore so arranged that the valve pin will seat between the gas inlet and the first expansion chamber. It will be observed that the employment of materials having a high heat conductivity and providing a relatively large exposed surface to the gas in expansion chambers along the gas passageway, assures a particularly effective warming of the gas so as to prevent the gas from freezing and to prevent the thermal conditions within the valve from adversely affecting the materials of which it is composed. In order to increase the surface of high conductive metal exposed to the gas, the washers 39 may be composed of such metallic substance or substances having a high thermal conductivity, as may be desired.

In certain instances, as, for example, in the rapid decompression of a highly compressed gas, it is desirable to provide means for rapidly supplying to the body of the valve sufficient heat to replace the heat drawn therefrom by the valve seat, and to this end, the invention, in certain of its aspects, contemplates the provision of suitable means about the body of the valve to withdraw a maximum amount of heat from the atmosphere and supply it to the valve body.

Figs. 9 and 10 exemplify one such arrangement, wherein the heat conductivity of an enclosed liquid and the heat-absorbing qualities of spaced fins are utilized in the transfer of heat from the atmosphere to the valve body. In the exemplified arrangement a liquid container composed of a suitable metallic substance is mounted on the valve body, adjacent the valve seat, as by means of screw threads 41 and retainer members 42 and 43, the container being shaped to provide a series of fins 44, whereby the container presents a particularly large exposed surface to the atmosphere. The container is provided with a suitable plug 45, through which there may be introduced a suitable liquid, whereby the rapid conduction of heat from the container walls to the body 8' of the valve is assured. Preferably, a non-freezing liquid, such as brine, a mixture of ethylene glycol and water, or the like is employed. If desired, portions of the body of the valve may, of course, be cut away to permit the liquid to contact directly with the higher heat conductive metal of the valve seat, shunting out thereby the path of relatively lower conductivity of the valve body, and its imperfect metal contact with the unlike metal of the valve seat.

The construction shown in Fig. 11 is similar in all respects to that shown in Fig. 9, except that the valve seat is shown as constructed in accordance with Fig. 7.

It is to be noted that in all the modifications shown the body member with which the valve seat is in contact is exposed directly to a fluid (either air or liquid) which acts to carry heat therefrom.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

I claim:

1. In a decompression valve, the combination of a valve member and a valve seat, said valve seat being composed of layers of metallic substances varying in hardness and thermal conductivity, the hardness of the layers decreasing and the thermal conductivity thereof increasing in the direction of flow of the expanding gas.

2. In a decompression valve, the combination of a laminated valve seat comprising a layer of silver, and a layer of a harder metallic substance disposed before the silver layer in the direction of gas flow, and a valve member adapted to contact with both layers.

3. In a decompression valve, the combination of a valve member and a laminated valve seat comprising a layer of silver, and a layer of a hard alloy of silver disposed before the silver layer in the direction of the gas flow.

4. In a decompression valve, the combination of a valve member and a laminated valve seat comprising a layer of copper, and a layer of a harder metallic substance disposed before the copper layer in the direction of the gas flow.

5. In a decompression valve, the combination of a valve member and a laminated valve seat comprising a layer of virgin silver, a layer composed of a harder alloy of silver, a layer of copper, and a layer harder than said copper layer composed of an alloy of silver and copper, said layers being arranged inversely to the direction of flow of the expanding gas.

6. In a decompression valve, the combination of a valve seat comprising a plurality of annular members each composed of a metallic substance having thermal conductivity not materially lower than that of copper and spaced one from another to provide expansion chambers therebetween, said annular members being composed of different metallic substances, the hardness of the substance decreasing and the thermal conductivity thereof increasing in the direction of flow of the expanding gas.

7. In a decompression valve, the combination of a valve pin having a diameter which increases from the point of the pin inwardly, and a laminated valve seat comprising a layer of relatively hard material having a relatively small central orifice, and a layer of softer material having a greater thermal conductivity and having a larger orifice, said valve pin being adapted to seat at least against the layer of hard material.

8. In a decompression valve, the combination of a valve pin, the diameter of which increases in the direction of gas flow, and a valve seat composed of a plurality of metallic annuli the thermal conductivity of which increases in the direction of gas flow and which are formed with central openings of such diameter that the pin will seat against each of said annuli when in closed position.

9. In a decompression valve, the combination of a valve pin, the surface of which is defined by the revolution of a portion of a parabolic curve about the central axis of the pin, and a valve seat composed of a plurality of metallic annuli formed with central openings of such diameter that the pin will seat against each of said annuli when in closed position.

10. In a decompression valve, the combination of a metallic body member having its outer surface exposed, means adapted for providing a supply of fluid adjacent said surface, a valve member, and a laminated valve seat comprising a layer of silver and a layer of a harder metallic substance disposed before the silver layer in the direction of gas flow, each of said layers having a surface contacting with the inner surface of the body member.

11. In a decompression valve, the combination of a metallic body member having its outer surface exposed whereby a source of heat may be brought into contact therewith, a valve member, and a laminated valve seat comprising a layer of silver and a layer of a harder metallic substance disposed before the silver layer in the direction of gas flow, each of said layers having a surface contacting with the inner surface of the body member.

12. In a decompression valve, the combination of a valve seat comprising a plurality of annular metallic members varying in hardness and thermal conductivity and spaced one from another to provide space for the expansion of gas.

13. In a decompression valve, the combination of a valve seat, comprising a plurality of annular members, the thermal conductivity of which increases in the direction of gas flow, and spaced one from another to provide space therebetween for the expansion of the gas, said annular members being formed with an aligned central opening therein, and a valve pin adapted to seat against each of said annular members when in closed position.

14. In a decompression valve, the combination of a valve pin having a diameter which increases from the point of the pin inwardly, and a valve seat composed of a plurality of metallic annuli spaced one from another to provide expansion chambers therebetween and formed to provide a passageway having an increasing diameter in the direction of flow of the gases, said metallic annuli decreasing in hardness in the direction of gas flow, said valve pin being adapted to seat against a plurality of said annuli.

15. In a decompression valve, the combination of a metallic body, a valve member, a valve seat composed of layers of metallic substances varying in hardness and thermal conductivity, an enclosure for said body having an extensive outer surface and providing space for a fluid within the same, and a body of liquid held within said enclosure.

16. In a decompression valve, the combination of a metallic body member, a valve member, a valve seat composed of layers of metallic substances increasing in softness and thermal conductivity in the direction of gas flow and being spaced one from another to provide spaces for the expansion of gas therebetween, the furthermost of said layers being composed of silver, an enclosure for said body member having an extensive outer surface and providing space for a fluid within the same, and a body of liquid held within said enclosure.

17. A decompression valve comprising a valve member, a metallic valve seat member providing a central bore for the reception of the valve member and having a high thermal conductivity whereby heat is readily transmitted from its exterior to the expanding gases, said valve seat member having a thermal conductivity higher than that of copper, and a metallic body member providing an uninterrupted conducting unit fitting about said valve seat member and in peripheral heat-conducting contact therewith and having an exposed exterior adapted to be in contact with a fluid for ready absorption of heat therefrom and transmittal of heat to the exterior of the valve seat member.

18. A decompression valve comprising a valve member, a metallic valve seat providing a central bore for the reception of the valve member and having a high thermal conductivity whereby heat is readily transmitted from its exterior to the expanding gases, said valve seat having a thermal conductivity higher than that of copper, and a metallic body member providing an uninterrupted conducting unit fitting about said valve seat and in peripheral heat-conducting contact therewith and against one face thereof and having an exposed exterior adapted to be in contact with a fluid for ready absorption of heat therefrom and transmittal of heat to the exterior of the valve seat.

19. A decompression valve comprising a valve member, a metallic valve seat member providing a central bore for the reception of the valve member and having a high thermal conductivity whereby heat is readily transmitted from its exterior to the expanding gases, said valve seat member having a thermal conductivity higher than that of copper, a metallic body member providing an uninterrupted conducting unit fitting about said valve seat member and in peripheral heat-conducting contact therewith and having an exterior exposed to a fluid for ready absorption of heat therefrom and transmittal of heat to the exterior of the valve seat member, and an enclosure of said body member having an extensive outer surface and providing space for said fluid within the same, said space being filled with a liquid whereby heat is readily transmitted from the surrounding air to said body member.

20. A decompression valve comprising a valve member, a metallic valve seat member providing a central bore for the reception of the valve member and having a high thermal conductivity whereby heat is readily transmitted from its exterior to the expanding gases, said valve seat member having a thermal conductivity higher than that of copper, and a metallic body member providing an uninterrupted conducting unit fitting about said valve seat member and having an exposed exterior adapted to be in contact with a fluid for ready absorption of heat therefrom and transmitttal of heat to the exterior of the valve seat member, said valve seat member comprising a layer of silver and a layer of a harder metallic substance disposed before the silver layer in the direction of gas flow, each of said layers having a surface contacting with the inner surface of the body member.

21. A decompression valve comprising a valve member, a valve seat member composed of silver and providing a central opening for the reception of the valve member, and a metallic body member providing an uninterrupted conducting unit fitting about said valve seat member and in peripheral heat-conducting contact therewith and having an exposed exterior adapted to be in contact with a fluid for ready absorption of heat therefrom and transmittal of heat to the exterior of the valve seat member.

22. A decompression valve comprising a valve member, a valve seat member composed of silver and providing a central opening for the reception of the valve member, a metallic body member providing an uninterrupted conducting unit fitting about said valve seat member and in peripheral heat-conducting contact therewith and having an exterior exposed to a fluid for ready absorption of heat therefrom and transmittal of heat to the exterior of the valve seat member, and an enclosure of said body member having an extensive outer surface and providing space for said fluid within the same, said space being filled with liquid whereby heat is readily transmitted from the outer air to said body member.

KARL CONNELL.